Figure 1:
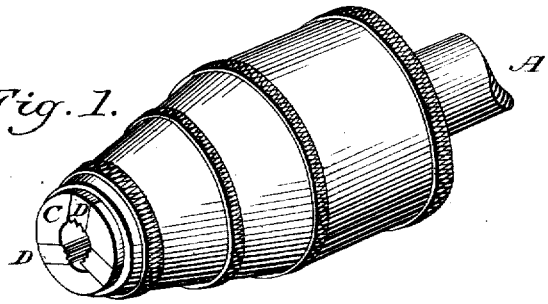

C. GAGE,

Assignor to himself and L. B. RUSSELL.

DRILL CHUCK.

No. 10,205. Reissued Sept. 26, 1882.

Witnesses:

H. C. Brett

W. H. Bonnoth

Inventor:

Charles Gage

N. PETERS, Photo-Lithographer, Washington, D. C.

UNITED STATES PATENT OFFICE.

CHARLES GAGE, OF BOSTON, ASSIGNOR TO HIMSELF AND LEWIS B. RUSSELL, OF LYNN, MASSACHUSETTS.

DRILL-CHUCK.

SPECIFICATION forming part of Reissued Letters Patent No. 10,205, dated September 26, 1882.

Original No. 247,035, dated September 13, 1881. Application for reissue filed June 23, 1882.

*To all whom it may concern:*

Be it known that I, CHARLES GAGE, residing at Boston, in the county of Suffolk, in the State of Massachusetts, have invented a new and useful Improvement in Chucks for Driving Drills to Pierce Metal or Wood, of which the following is a specification.

Drill-chucks as heretofore constructed have been more or less deficient in driving-power, because their jaws have moved in a line pointing direct to the drill-shank axis and have not been supported from end to end in their guiding-ways. In some cases the jaws have been given a certain amount of play or looseness in their guiding or slide ways, and have therefore had two directions of motion. The first of these occurred while approaching the drill-shank, being in a line direct toward the same; but by reason of the points or lines of contact of the jaws being located to one side of the thickness of the same, and also by reason of the play or looseness of the jaws in their guiding or slide ways, so soon as they had forcible contact with the drill a side motion of each jaw in its guiding-way occurred, so that the path of motion of the jaw, in becoming locked upon the drill-shank, was a curve, each jaw canting over in its guiding-ways and bearing upon the same at the ends only. The defects of this action were, first, that the guiding-ways were unduly subject to wear by reason of the jaw, in locking upon the drill-shank, binding sidewise and at the corners only of its guiding-way; second, that by reason of the side motion of the jaw the release of the jaw-grip, when it has been required to remove the drill, has been retarded by the jaw, requiring to move back and into line with its guiding-way, and it has therefore required as much power to release as to tighten the jaws. Furthermore, in drill-chucks as heretofore constructed the jaws (or each jaw) have been guided and sustained against the gripping-pressure by one guideway only for each jaw, this guiding-way usually standing with its length at an angle of about thirty degrees from the axial line of the chuck, and therefore not in the direction best suited to resist the strain due to the grip of the jaws upon the drill-shank.

The object of my invention is to remedy these defects by so constructing a drill-chuck that its jaws, while closing upon and gripping the drill-shank, shall move in two or more closely-fitting guiding-ways, one of which is at an angle of about thirty degrees and the other or others at an angle of ninety degrees to the axial line of the chuck. Furthermore, the object of my invention is to so locate the guide-ways for each jaw that the jaw in moving upon and gripping the drill-shank shall be closely guided along its whole length to move in a line or direction pointing to one side and in advance of the center of the drill-shank, so that when the chuck is rotating the gripping-point or line of each jaw will be in advance in the direction of rotation of a radial line from the axis of the chuck, to the end that the closure of each jaw upon the drill-shank center may, under a given amount of shell motion, be diminished, by which means I increase the driving-power of the chuck.

The object of my invention is, furthermore, to provide a drill-chuck in which each jaw shall be supported on the sides throughout its entire length, whether it be opened or closed to its fullest extent, and in which each jaw shall receive along its full length parallel to the chuck-axis driving-pressure from one side of its guiding-ways.

I attain these objects by the mechanism illustrated in the accompanying drawings, in which—

Figure 2:
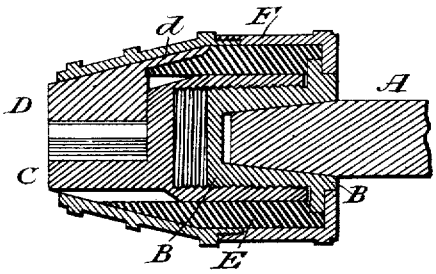
Figure 3:
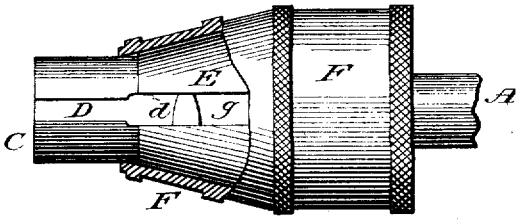
Figure 4:
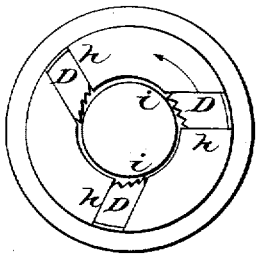
Figure 5:
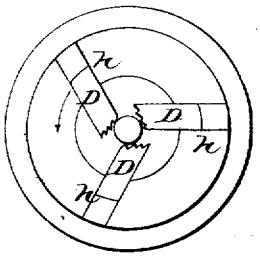
Figure 7:
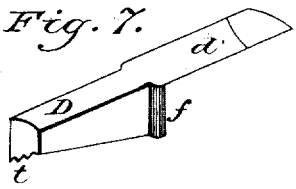
Figure 6:
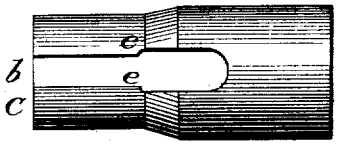

Figure 1 is a view of the chuck complete. Fig. 2 is a sectional side elevation, showing the internal mechanism of the chuck when the jaws and their guide-piece are within it and opened to receive the largest diameter of drill. Fig. 3 is a side elevation, partly in section, showing the chuck with its jaws and their guide-piece extended from the chuck as they are when closed to their fullest extent. Fig. 4 is an end view, showing the manner in which the jaws grip a drill-shank of large diameter. Fig. 5 is a similar end view, showing how the jaws grip a drill-shank of small diameter. Fig. 6 is a view of the jaw-guiding piece removed from the jaws, so as to show the guideways at an angle of ninety degrees to the chuck-axis; and Fig. 7 is a view of a jaw removed from the chuck, to show the guides on its sides.

Similar letters refer to similar parts throughout the several views.

A represents the arbor to be driven by the live spindle of the lathe, and to drive the chuck by reason of being tapered, and fitting tightly into a corresponding taper-hole in B, which is provided with an external left-hand thread screwing into the jaw-holding or jaw-driving piece C, which is provided at its outer end with three longitudinal slots, *b*, which drive and guide the gripping-jaws D, by which the drill-shank is gripped. C is also provided with one or more guideways, *e*, for each jaw, said guideways receiving corresponding guides or projections *f* on the sides of the jaw, and being at a right angle to the axial line of the chuck. The external surface of C is a working fit to parallel bore of the piece E, the latter being provided on its external-coned surface with inclined guideways *g*, to receive the wings *d* of the jaws D. At the rear end of B is a flange, a working fit in an annular groove in E, and detained therein by the rear end of the outer shell, F. Shell F is secured to E by a pin, so that by rotating or operating F, E, also, is operated, while the two form at the rear end a journal-bearing for the flange of piece B, preventing its end motion and causing its rotation within E and F to impart end motion to the jaw-guide piece C. As this end motion occurs the wing *d* of each jaw D is traversed along the inclined guideways provided on the coned exterior of E, causing each jaw to advance or recede (according to the direction of rotation of the shell F) to or from the axis of the chuck, and either grip or release the drill-shank, as the case may be. During this motion the jaws are guided by the inclined guideways *g* in E, by the guideways *e* in C, and as the latter moves longitudinally with the jaws it therefore also supports them along the full length of the guideways *b*. The longitudinal guideways in C are so located that their driving-faces *h* are in a line radial from the chuck-axis, while the opposite side of each guideway is in a line passing to one side of the chuck center, which causes the beveled or inclined gripping surfaces of the jaws to meet the drill-shank in advance (in the direction of rotation of the chuck) of the driving-surfaces *h*, whatever the diameter of the drill may be. Thus in Fig. 4 the jaws receive driving-pressure at *h*, but grip the drill-shank at *i*, the direction of rotation being denoted by the arrow. This increases the grip of the jaws, because although the jaws are closely guided to close in a straight line, yet, by reason of their line of motion not being direct toward the center of the drill-shank, their rate of approach toward that center is reduced in proportion to any given amount of shell rotation, and the gripping power is obviously proportionately increased, and that without diminishing the rate of jaw motion.

I am aware that the grip of chuck-jaws may be increased by the use of finer threads for operating the jaw-piece, as C; but in this case the threads wear out more rapidly, and the rate of motion of the jaws is reduced, entailing loss of time in opening and closing them for different sizes of drills, whereas in my improvement it is not that the rate of jaw motion is reduced, but that with the same amount of motion it grips the drill-shank more gradually, and therefore more forcibly. To further increase the grip of the jaws, when necessary, their holding-surfaces are provided with serrations or teeth *t*, which may be either parallel to said surfaces or diagonal to them.

I do wish to confine myself to the number of jaws used or to the mechanism described for operating them, as it is obvious that any other suitable mechanism may be employed to actuate the jaws when the latter are constructed and arranged to close upon and grip the drill moving in closely-fitting guiding-ways pointing in advance of the chuck-axis when considered with relation to its direction of rotation, as herein described.

What I claim as my invention, and desire to secure by Letters Patent, is—

1. In a drill-chuck, the jaws D, each of which has one of its sides arranged upon a line radiating from the axis of the chuck and its line of grip upon the drill-shank in advance (in the direction of chuck rotation) of this radiating line, substantially as set forth.

2. In a drill chuck, the combination of the jaws D with their guiding-piece C, arranged to move longitudinally together, substantially as set forth.

3. In a drill-chuck, the jaw-guiding piece C, having the guideways *e* and the guideways *b*, substantially in the manner and for the purpose set forth.

4. In a drill-chuck, the jaws D, having the guides *f* and the wings and guide-pieces *d*, substantially as set forth.

5. In a drill-chuck, the jaw-guiding piece C, having its guideways arranged with one surface pointing to the chuck-axis and the other pointing to one side of the same, substantially as set forth.

6. In a drill chuck, the combination of the cone-piece E with the guide-piece C and the jaws D, as and for the purpose set forth.

CHARLES GAGE.

In presence of—
JNO. L. ROBINSON,
JOHN BROOKS.

Corrections in Reissue Letters Patent No. 10,205.

It is hereby certified that in line 78, page 2 of the printed specification of Reissue Letters Patent No. 10,205, granted September 26, 1882, upon the application of Charles Gage, of Boston, Mass., for an improvement in "Drill Chucks," the word "not" was inadvertently omitted after the word "do;" and that the proper corrections have been made in the files and records of the Patent Office, and are hereby made in said Letters Patent.

Signed, countersigned, and sealed this 14th day of November, A. D. 1882.

[SEAL.]

M. L. JOSLYN,
*Acting Secretary of the Interior.*

Countersigned:

E. M. MARBLE,
*Commissioner of Patents.*